US008654258B1

United States Patent
Ghiya et al.

(10) Patent No.: US 8,654,258 B1
(45) Date of Patent: Feb. 18, 2014

(54) METHOD AND APPARATUS FOR ESTIMATING NOISE IN A VIDEO SIGNAL

(75) Inventors: Ankit Ghiya, Madhya Pradesh (IN); Shilpi Sahu, Karnataka (IN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/537,193

(22) Filed: Jun. 29, 2012

Related U.S. Application Data

(63) Continuation of application No. 12/417,542, filed on Apr. 2, 2009, now Pat. No. 8,212,932.

(60) Provisional application No. 61/080,460, filed on Jul. 14, 2008.

(51) Int. Cl.
*H04N 5/21* (2006.01)
*H04N 5/213* (2006.01)

(52) U.S. Cl.
USPC .......... 348/607; 348/618; 348/627; 348/701; 382/266; 358/463

(58) Field of Classification Search
USPC .......... 348/607, 618, 672, 627, 701; 382/266, 382/168; 358/463, 522
See application file for complete search history.

(56) References Cited

U.S. PATENT DOCUMENTS 7,715,645 B2   5/2010   Zhou et al.
7,860,311 B2 *  12/2010   Chen et al. .................... 382/173

OTHER PUBLICATIONS

Amer, "Fast and Reliable Structure-Oriented Video Noise Estimation," IEEE Transactions on Circuits and Systems for Video Technology, pp. 113-118, vol. 15, No. 1, Jan. 2005.
Ghazal, "A Real-Time Technique for Spatio-Temporal Video Noise Estimation," IEEE Transactions on Circuits and Systems for Video Technology, pp. 1-10, 2007.
Russo, "A Method for Estimation and Filtering of Gaussian Noise in Images," IEEE Transactions on Instrumentation and Measurement, pp. 1148-1154, vol. 52, No. 4, Aug. 2003.

\* cited by examiner

*Primary Examiner* — Jefferey Harold
*Assistant Examiner* — Jean W Desir

(57) ABSTRACT

A method and system for detecting and estimating noise in a video signal. For example, detail edges may be identified in a plurality of pixels, wherein each detail edge has an edge magnitude value. The detail edges in the plurality of pixels may be identified by: determining one or more directionality values for the plurality of pixels by passing the input video signal through at least one directional filter, and identifying the detail edges by assigning edge magnitude values based on whether the one or more directionality values exceed predetermined threshold levels. An edge map of the detail edges may be created, where the edge map is configured to indicate areas of the plurality of pixels to be considered or ignored in estimating the noise in the input video signal. The noise in the input video signal may then be estimated based on the indicated areas of the edge map.

18 Claims, 6 Drawing Sheets

METHOD AND APPARATUS FOR ESTIMATING NOISE IN A VIDEO SIGNAL

CROSS-REFERENCE TO RELATED APPLICATIONS

This application is a continuation of U.S. patent application Ser. No. 12/417,542 (issuing as U.S. Pat. No. 8,212,932), filed Apr. 2, 2009, entitled "Video Noise Estimator," which claims priority to U.S. Provisional Patent Application No. 61/080,460, filed Jul. 14, 2008, entitled "Video Noise Estimator," which is hereby incorporated by reference in its entirety.

BACKGROUND

1. Field of the Invention

The present invention relates generally to the field of video signal processing and noise estimation.

2. Description of the Related Art

Removing noise from a video signal either before or after performing video processing functions (i.e., de-interlacing, edge enhancement, scaling, etc.) may improve video quality. However, noise removal often has the effect of either softening the image by attenuating the spatial details of the signal, or introducing ghosting artifacts. Therefore, it is important to avoid unnecessary noise filtering in order to maintain the sharpness of detail in the video signal.

Before noise is removed, an estimate of the noise existent in the signal is necessary in order to remove the proper frequencies. There are several ways to estimate noise and to differentiate between noise and the details of the video signal, including block based methods. Block based methods of noise estimation attempt to locate regions in the signal with the least amount of signal variation. Variances calculated on the homogenous regions or blocks are considered in the computation of noise in the signal. However, if the block evaluated is only a small portion of the total signal, the calculated noise may not be representative of the entire signal. Additionally, the implementation of a wavelet based noise estimation approach may be computationally complex and require extra hardware.

A block based noise estimator, specifically adapted for Gaussian noise in video, and tunable to adapt to lower noise power situations may have simpler computational complexity than other noise estimators, may be more effective than a simple noise estimator, and may overcome some of the difficulties typical when implementing a traditional block based noise estimator.

SUMMARY

Embodiments of the present invention provide a system and method for detecting and estimating noise existent in an input video signal. This is further accomplished by identifying homogenous regions in the input video signal and creating a histogram of the magnitude values for the pixels comprising such regions. Upon identification and separation of sufficient pixels, an estimate of the standard deviation of the magnitude values is determined. Such standard deviation may then be utilized to remove the estimated noise from the signal.

BRIEF DESCRIPTION OF THE DRAWINGS

The present invention is described herein with reference to the accompanying drawings, similar reference numbers being used to indicate functionally similar elements.

DETAILED DESCRIPTION OF EMBODIMENTS

Objects and advantages of the present invention will become apparent from the following detailed description.

Figure 1:
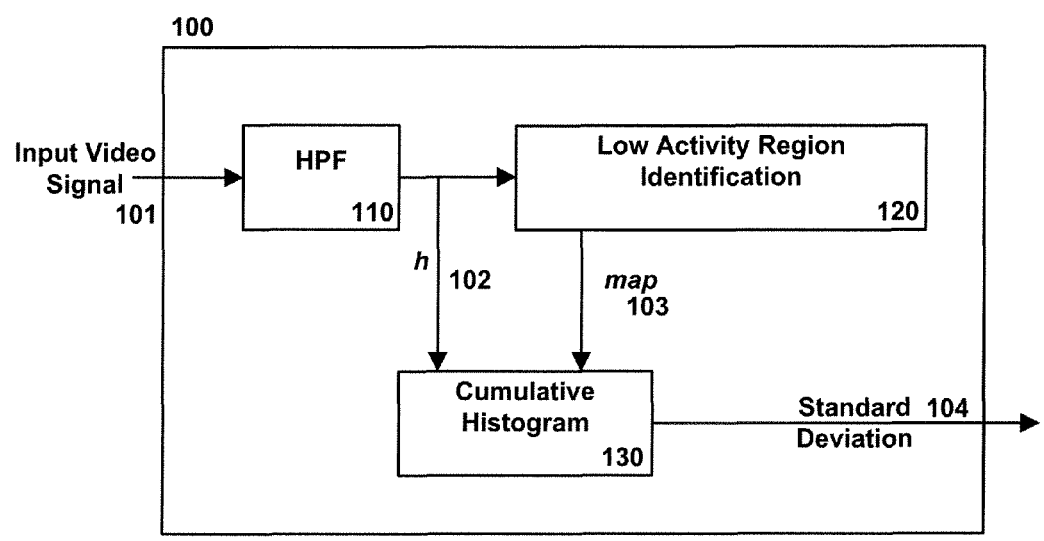
FIG. 1 shows one embodiment of a noise estimator.

In FIG. 1, which shows one embodiment of a noise estimator 100, an input video signal 101 passes through a high-pass filter (HPF) 110. An HPF output signal 102 is sent to both a low activity region identification module 120 and a cumulative histogram module 130. The output of the low activity region identification module 120 is a binary map 103 that is sent to the cumulative histogram module 130. The output of the noise estimator 100 is the standard deviation of the noise power 104 in the input video signal 101. Standard deviation may also be calculated as the square root of variance; however, in this disclosure, the terms standard deviation and variance are used interchangeably.

The output signal 102 is a zero mean signal containing both high frequency noise and lower frequency spatial details. In one embodiment, the HPF filter 110 may be composed of a bank of 2×2 or 3×3 HPF or band pass filters (BPF), or a combination of both. Unlike noise, the real details of a video signal usually contain a spread of frequencies around the band-pass and high-pass frequency regions. Consequently, either filter type should effectively limit noise without significant deterioration of the fine details of the signal.

Figure 2:
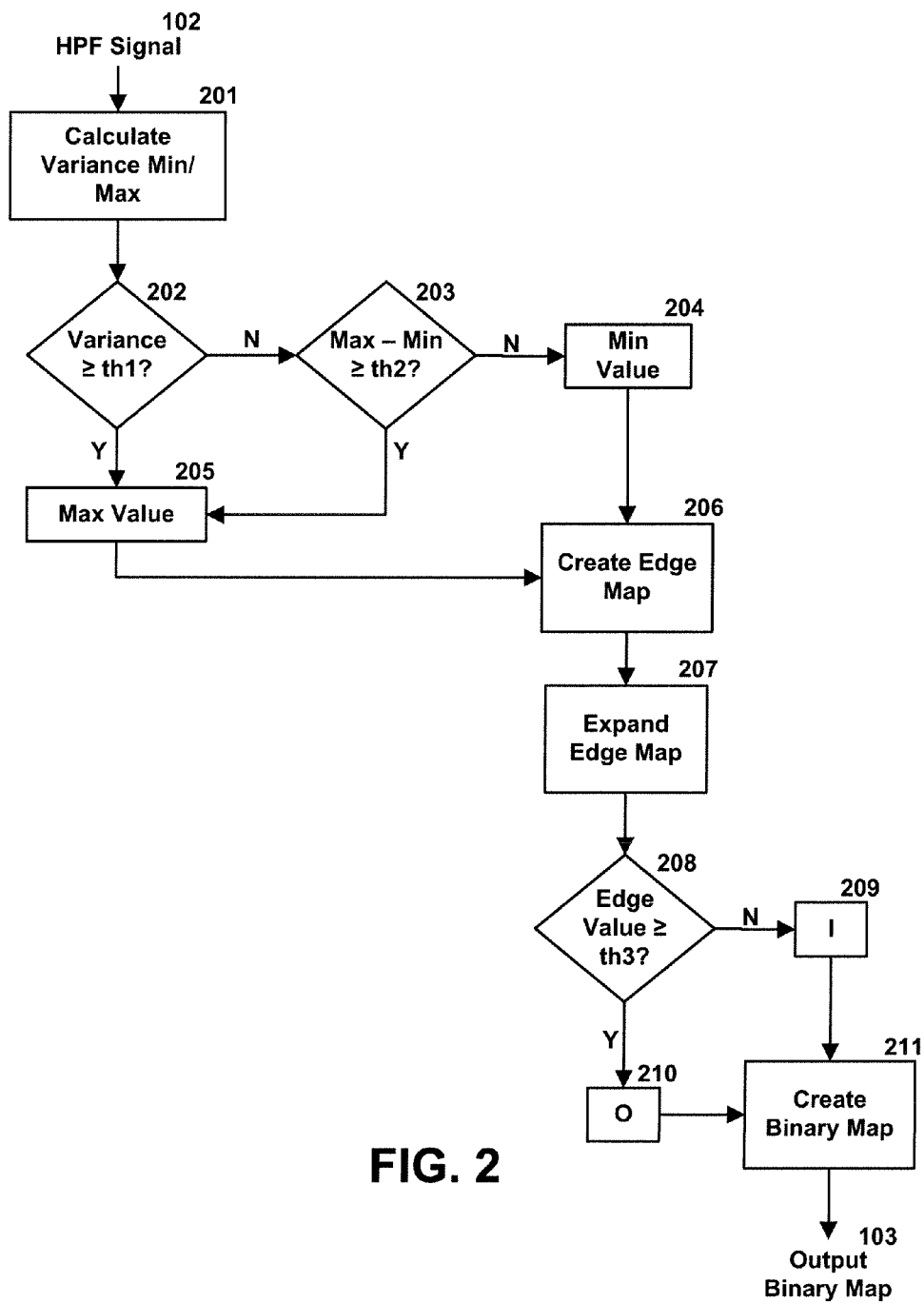
FIG. 2 shows a flow diagram in accordance with one embodiment by which a binary map representing the homogenous regions of a video input signal is created.

The complexity of the low activity region identification module 120 can vary depending on the requirements of the system with respect to computational delay and implementation costs. Any block-based noise detection method should be effective for homogeneity detection. In one embodiment, the low activity region identification module 120 may be a simple threshold detector with an heuristics module that detects regions with low activity or homogeneity. As shown in the flow chart in FIG. 2, the identification module 120 creates a binary map 103 that highlights the pixels that appear to be part of a stray edge. In one embodiment, using three, directional, 2×2 HPFs, one in each of the horizontal (h1), vertical (h2) and diagonal (h3) directions, the identification module 120 calculates at 201 the variance on the difference between the minimum and maximum magnitude of the directional HPF outputs over a small window around a pixel of interest. This calculation is represented below in Equation 1.

$$\text{var} = \Sigma(\max(h1,h2,h3) - \min(h1,h2,h3))^2 \qquad (1)$$

The identification module 120 next determines whether the variance calculated exceeds or equals a first threshold (th1) at 202 and whether the difference of the maximum and minimum exceeds or equals a second threshold (th2) at 203. For genuine directional detail, the magnitude of one of the directional filter outputs may differ greatly from the other directional outputs; noise, however, is generally non-directional in nature. Therefore, if max(h1, h2, h3)−min(h1, h2, h3) is greater than or equal to th2, the directional signal should represent a detail edge. If neither value exceeds the relevant threshold, the minimum value is selected at 204 to represent the pixel of interest in the edge map created at 206. Otherwise, the maximum value is selected at 205 to represent the pixel in the map.

It may be appropriate to exclude the grey levels lying in the extremes of the luminance ranges from map generation. Such exclusion should eliminate any letter boxing effect that may be present in the input signal 101. Additionally, noise distribution in the extreme grey areas may be unreliable due to clamping.

The resulting edge map can be expanded around the pixel of interest at 207 to ensure that the appropriate edges and details are covered by the edge map. In order to expand the edge map, once a detail edge has been identified by the identification module, the pixels surrounding the identified edge, horizontally and vertically, are also selected as part of the edge. The resulting edge map may then reflect the inclusion of the additional pixels as part of the identified edges.

The magnitudes of the values in the edge map may then be compared to a third threshold (th3) at 208 to create the binary map signal 103. If the edge map value is lower than th3, the pixel belongs to a homogenous area and is valuable for estimating noise in the signal. Otherwise, where the map value is greater than or equal to th3, the pixel belongs to a detailed area which should not be considered in the noise estimation. The binary map may reflect this determination by setting the value for the signal to 1 at 209 if the pixel is valuable for estimating the noise in the signal, or to 0 at 210 if the pixel is not valuable for the estimation. The three threshold values may be programmable to yield appropriate results for a range of possible signal to noise ratios in the system. The binary map 103 is compiled at 211 and output to the cumulative histogram module 130.

In one embodiment, any zero mean signal output 102 from any one of the potential filters implemented in the HPF 110 can be input into the cumulative histogram module 130 to compute standard deviation of the noise power. Alternatively, an entirely different filter may be implemented to create the filtered signal 102 that is sent to the cumulative histogram module 130. However, the filter coefficients may be scaled so that the power of the output 102 remains unchanged from that of the input signal 101.

Figure 3:
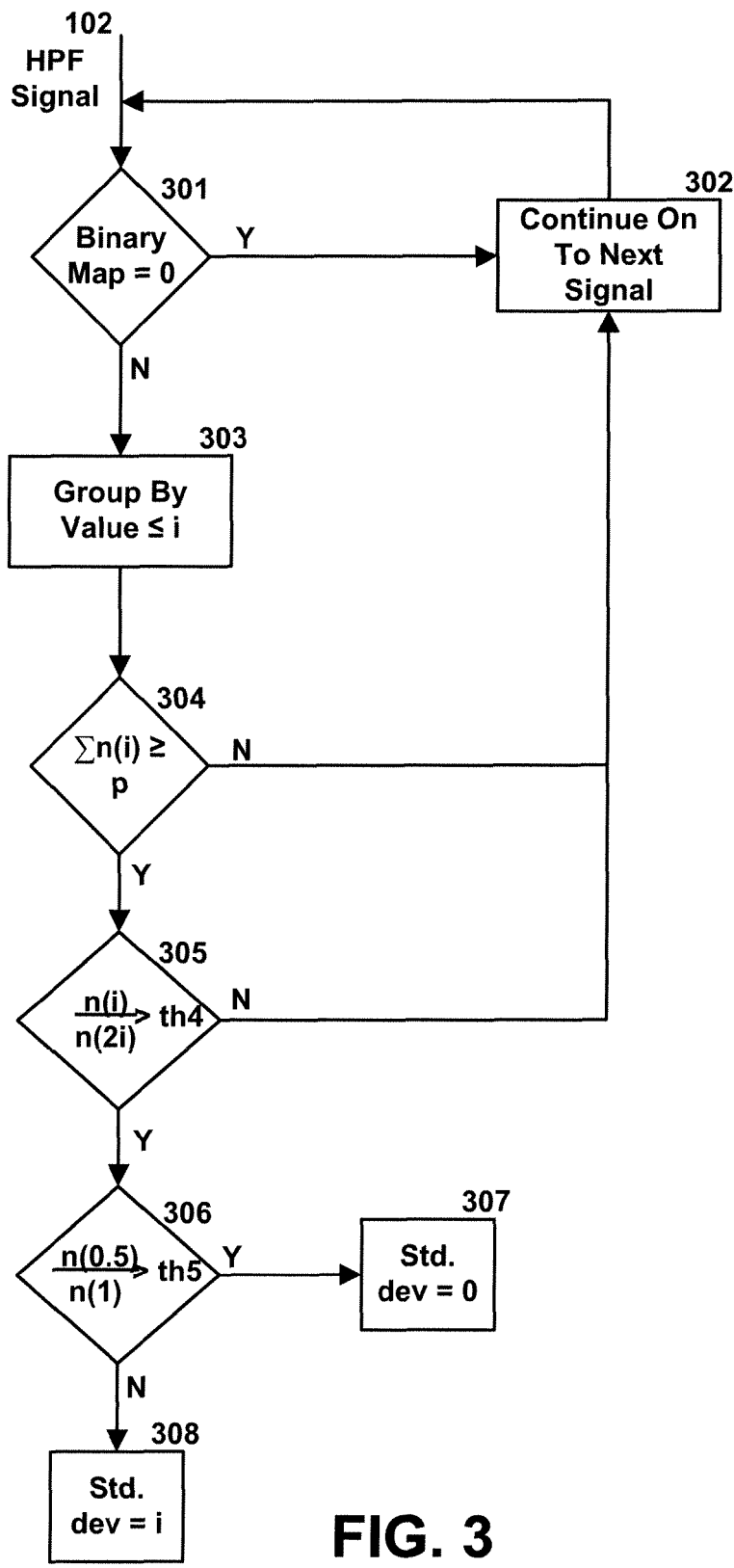
FIG. 3 shows a flow diagram in accordance with one embodiment by which a cumulative histogram module computes the standard deviation of noise in a signal.
Figure 4:
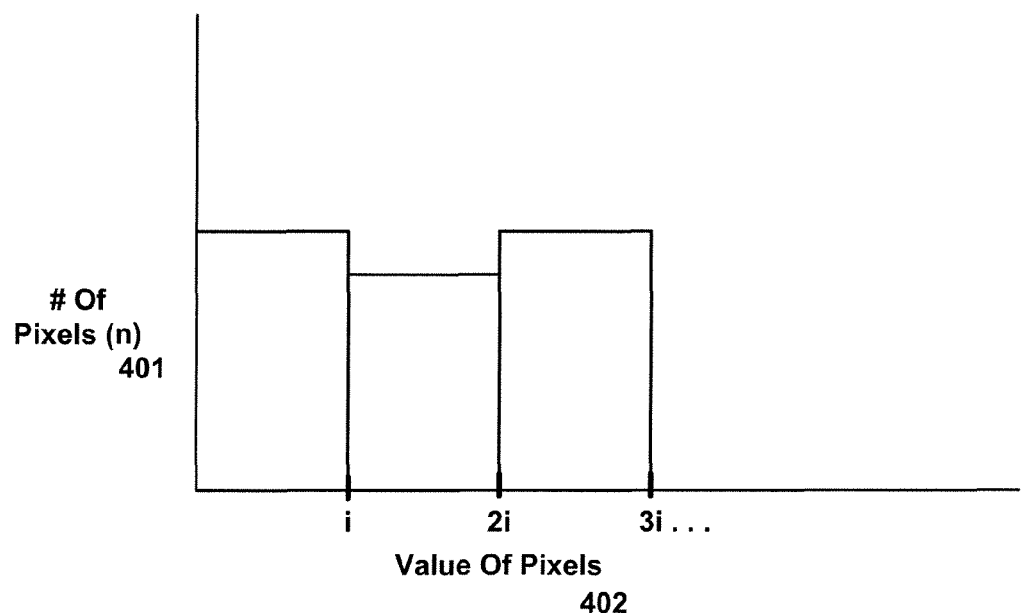
FIG. 4 shows an example of a histogram created by a cumulative histogram module in one embodiment.

FIG. 3 illustrates a flow chart of computation of standard deviation in accordance with one embodiment of the cumulative histogram module 130, assuming Gaussian noise input. The cumulative histogram module 130 separates the HPF signal outputs 102 into separate groups based on the magnitude of the signal wherein the signals in a group have a value less than or equal to a threshold (i). Using steps of 0.5 for the i threshold values, the standard deviation calculated should be accurately estimated for values between zero and four. Alternatively, each group can be considered as a bar on a histogram as shown in FIG. 4. X-axis 402 tracks the value of the pixels according to each increment of threshold i. Y-axis 401 tracks the number of pixels in each threshold group.

The programmable total (p) represents the minimum number of samples to be examined to allow for accurate estimation. Delaying the standard deviation calculation until there are enough samples to generate a reliable estimation may also reduce computation delays if the histogram module 130 is not required to perform a calculation every frame and is not otherwise limited by frame boundaries. Therefore, depending on the frame size, calculations may be made once every few frames or multiple times per frame. This also has the effect of adding a temporal aspect to the standard deviation calculations if the samples are collected from multiple frames. The requirement that a fixed number of samples are collected before calculation of the variance may also allow for greater consistency in calculating the standard deviation and noise and allow for more reliable statistical analysis.

Looking again at FIG. 3, as shown at 301, the binary map 103 for the input HPF signal 102 is checked. If the value of the binary map is 0, the pixel represented by that signal is judged to be a detail. Accordingly, that pixel is ignored, as it is not relevant to the estimation of noise, and the next pixel of interest is evaluated 302. If a signal does not correlate to a detailed area (i.e., the binary map 103 for that pixel is set to 1), that signal is eligible for separation into a group, and the cumulative histogram module 130 proceeds to 303. At 303, the signal is separated into groups based on the magnitude of the signal and the threshold i of each group. The number of signals separated into a group may be represented by n(i). If, at 304, the total number of pixels eligible for grouping is less than the programmable number p, the cumulative histogram module 130 continues evaluating the next signal 302.

If enough samples have been evaluated ($\Sigma n(i) \geq p$), then at 305, the first group for which the ratio $r(i)=n(i)/n(2i)$ is greater than a fourth threshold value (th4), i is taken to be the estimated standard deviation 308 of the input signal 101. However, if at 306, $r(0.5) >$ a fifth threshold (th5), the signal is determined at 307 to have a standard deviation of 0. This exception is made only for computing standard deviation of 0. In the case of Gaussian noise, with i starting at 0.5 and increasing in increments of 0.5, and (in some embodiments) th4=0.7 and th5=0.8, the estimation error should be between 0 and 0.5.

Figure 5:
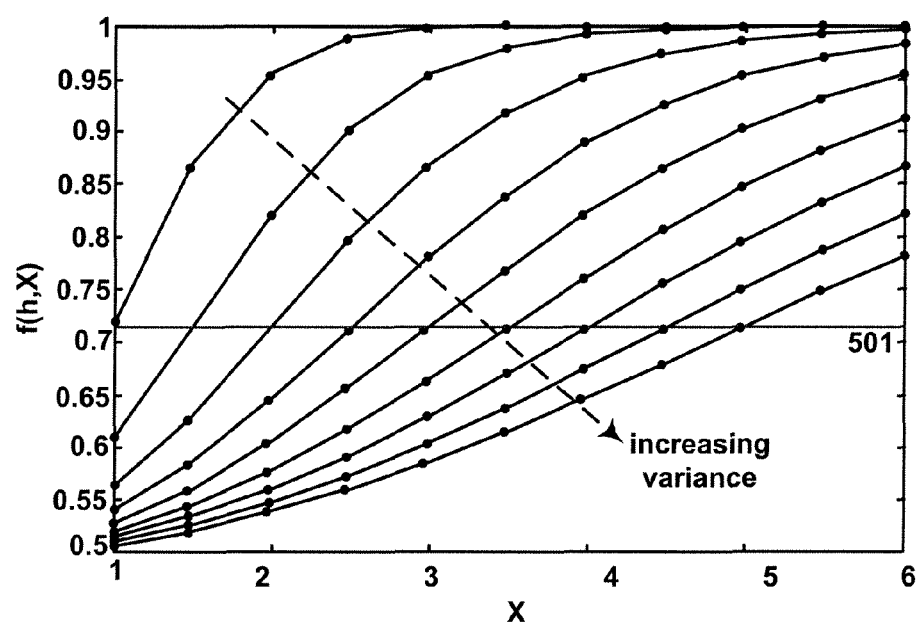
FIG. 5 shows an example of curves for the function f(h, X) for Gaussian variable h.

The noise estimation module 120 here takes advantage of the Gaussian nature of the noise. For example, FIG. 5 charts the function $f(h, X) = P(|h|<X)/P(|h|<2X)$ if the probability that the magnitude of a zero mean Gaussian random variable h is less than or equal to X is represented by $P(|h|<X)$. In FIG. 5, f(h, X) is shown for various Gaussian curves with standard deviation ranging from 1 to 5 in steps of 0.5. As shown, f(h,X) is a monotonically increasing function of X. As shown by the horizontal line 501, where X is the standard deviation of h. f(h, X) is constant. Therefore, if X is the standard deviation of h, then $P(|h|<X)/P(|h|<2X)=0.7152$. Alternatively, if $erf(X/\sqrt{2})$ is the error function defined as the cumulative probability of a normalized Gaussian variable lying between 0 and X, then $P(|h|<X)/P(|h|<2X)$ also equals $erf(X/\sqrt{2})/erf(2X/\sqrt{2}) = 0.7152$ provided X is the standard deviation of the Gaussian random variable h. Therefore, a threshold value of 0.7 may be used for the ratio or n(i)/n(2i) to determine when enough pixels in homogenous areas have been examined to accurately estimate the standard deviation of noise power in the input signal 101.

The total number of groups, as well as the threshold values of each group, can be adjusted depending on the range of the noise power desired to be estimated and the granularity with which it needs to be computed. Under this method, the estimation error should be between 0 and 0.5 if the filtered signal 102 has a resolution up to one decimal place and if the low activity region identification is generally accurate. If the standard deviation is higher than four, the noise estimator may under-estimate the standard deviation. It may be possible to improve estimation accuracy by performing another iteration on the signal after adjusting the programmable thresholds.

Figure 6:
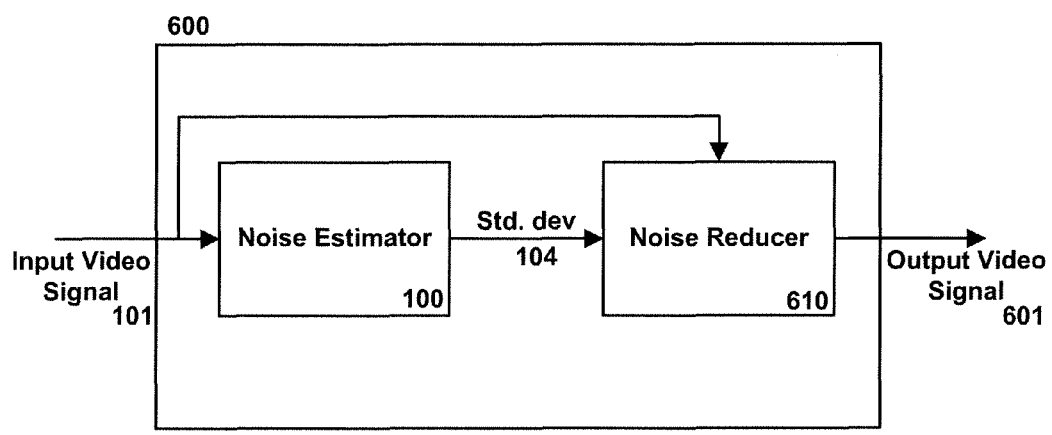
FIG. 6 shows one embodiment of a noise estimator combined with a noise reducer.

After the noise is estimated, it should be removed from the signal. In one embodiment, as shown in FIG. 6, a noise reduction unit 600 is composed of a noise estimator 100 and a noise reducer 610. Both the original input signal 101 and the standard deviation output 104 from the noise estimator 100 are input into the noise reducer 610. The output 601 of the noise reducer 610 is the input video signal 101 with reduced noise. The noise reducer 610 may consist of temporal and spatial filters with parameters and coefficients that may be controlled or adjusted by the standard deviation 104. In one embodiment, if the standard deviation and therefore the noise present in the input signal 101 is sufficiently small such that any noise induced errors are not significant, the noise reducer may be adjusted so that no noise frequencies are removed. This may help preserve the sharpness and detail of the video signal.

The invention as described may be implemented as hardware, software, or a combination of both. While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method for estimating noise in an input video signal, the method comprising:
   receiving an input video signal, wherein the input video signal comprises a plurality of pixels;
   identifying one or more detail edges in the plurality of pixels, wherein identifying the one or more detail edges in the plurality of pixels comprises
      determining one or more directional output values for the plurality of pixels by passing the input video signal through at least one directional filter, and
      comparing the one or more directional output values with one or more of a first threshold and a second threshold to determine which pixels of the plurality of pixels are part of the one or more detail edges, and
      assigning a value to each pixel determined to be a part of the one or more detail edges;
   creating an edge map based on the pixels of the plurality of pixels determined to be a part of the one or more detail edges
   comparing the values of the pixels in the edge map to a third threshold;
   creating a binary map based on the comparison of the values of the pixels in the edge map to the third threshold, wherein the binary map indicates which pixels of the pixels are valuable for estimating the noise in the input video signal; and
   estimating the noise in the input video signal based on the pixels indicated in the binary map as being valuable for estimating the noise in the input video signal.

2. The method of claim 1, wherein the pixels indicated in the binary map as being valuable for estimating the noise in the input video signal are in homogenous areas in the input video signal.

3. The method of claim 1, wherein the pixels indicated in the binary map as being valuable for estimating the noise in the input video signal are indicated by a value of 1 in the binary map.

4. The method of claim 1, wherein the at least one directional filter comprises a horizontal directional filter, a vertical directional filter, and a diagonal direction filter.

5. The method of claim 4, wherein:
   the horizontal directional filter, the vertical directional filter, and the diagonal directional filter are configured to respectively generate outputs h1, h2, and h3; and
   the one or more directional output values comprise
      i) a difference value for a given pixel calculated according to $$\max(h1,h2,h3)-\min(h1,h2,h3),$$

where $\max(h1, h2, h3)$ is a maximum magnitude of the outputs h1, h2, and h3 for the given pixel and $\min(h1, h2, h3)$ is a minimum magnitude of the outputs h1, h2, and h3 for the given pixel, and
      ii) a variance calculated according to $$\Sigma(\max(h1,h2,h3)-\min(h1,h2,h3)).$$

6. The method of claim 5, wherein:
   the predetermined threshold levels comprise a variance threshold level and a difference threshold level; and
   i) if the variance exceeds the variance threshold level or the difference value exceeds the difference threshold level, a high magnitude value is assigned to a detail edge,
   ii) otherwise, the detail edge is assigned a low magnitude value, wherein the low magnitude value is lower than the high magnitude value.

7. The method of claim 6, wherein the high magnitude value is $\max(h1, h2, h3)$, and wherein the low magnitude value is $\min(h1, h2, h3)$.

8. The method of claim 4, wherein each of the horizontal directional filter, the vertical directional filter, and the diagonal directional filter is a high-pass filter.

9. The method of claim 1, further comprising:
   expanding the detail edges in the edge map, including
      for an identified detailed edge in the edge map, selecting additional pixels surrounding the identified detail edge to be included as part of the identified detail edge.

10. A system for estimating noise in an input video signal, the system comprising:
   at least one directional filter configured to receive the input video signal and to produce an output indicating a directionality of the input video signal;
   a low activity region detector configured to perform operations including
      receiving an input video signal, wherein the input video signal comprises a plurality of pixels,
      identifying one or more detail edges in the plurality of pixels, wherein identifying the one or more detail edges in the plurality of pixels comprises
         determining one or more directional output values for the plurality of pixels by passing the input video signal through at least one directional filter, and
         comparing the one or more directional output values with one or more of a first threshold and a second threshold to determine which pixels of the plurality of pixels are part of the one or more detail edges, and
         assigning a value to each pixel determined to be a part of the one or more detail edges;
      creating an edge map based on the pixels of the plurality of pixels determined to be a part of the one or more detail edge
      comparing the values of the pixels in the edge map to a third threshold;
      creating a binary map based on the comparison of the values of the pixels in the edge map to the third threshold, wherein the binary map indicates which pixels of the pixels are valuable for estimating the noise in the input video signal; and
   a noise estimating module configured to estimate the noise in the input video signal based on the pixels indicated in the binary map as being valuable for estimating the noise in the input video signal.

11. The system of claim 10, wherein the pixels indicated in the binary map as being valuable for estimating the noise in the input video signal are in homogenous areas in the input video signal.

12. The system of claim 10, wherein the pixels indicated in the binary map as being valuable for estimating the noise in the input video signal are indicated by a value of 1 in the binary map.

13. The system of claim 10, wherein the at least one directional filter comprises a horizontal directional filter, a vertical directional filter, and a diagonal directional filter.

14. The system of claim 13, wherein:
the horizontal directional filter, the vertical directional filter, and the diagonal directional filter are respectively configured to generate outputs h1, h2, and h3; and
the one or more directional output values comprise
i) a difference value for a given pixel calculated according to $$\max(h1,h2,h3)-\min(h1,h2,h3),$$

where max(h1, h2, h3) is a maximum magnitude of the outputs h1, h2, and h3 for the given pixel and min(h1, h2, h3) is a minimum magnitude of the outputs h1, h2, and h3 for the given pixel, and
ii) a variance calculated according to $$\Sigma(\max(h1,h2,h3)-\min(h1,h2,h3))^2.$$

15. The system of claim 14, wherein:
the predetermined threshold levels comprise a variance threshold level and a difference threshold level; and
i) if the variance exceeds the variance threshold level or the difference value exceeds the difference threshold level, a high magnitude value is assigned to a detail edge,
ii) otherwise, the detail edge is assigned a low magnitude value, wherein the low magnitude value is lower than the high magnitude value.

16. The system of claim 15, wherein the high magnitude value is max(h1, h2, h3), and wherein the low magnitude value is min(h1, h2, h3).

17. The system of claim 13, wherein each of the horizontal directional filter, the vertical directional filter, and the diagonal directional filter is a high-pass filter.

18. The system of claim 10, wherein the low activity region detector is further configured to perform operations including:
expanding the detail edges in the edge map, including
for an identified detailed edge in the edge map, selecting additional pixels surrounding the identified detail edge to be included as part of the identified detail edge.

* * * * *